United States Patent [19]

Fujikawa et al.

[11] Patent Number: 4,830,045
[45] Date of Patent: May 16, 1989

[54] BREAKER VALVE

[75] Inventors: Toshihiro Fujikawa, Higashikurume; Itsu Itoh, Funabashi; Mitsuru Urashima, Narashino, all of Japan

[73] Assignee: Fuji Engineering Co., Ltd., Tokyo, Japan

[21] Appl. No.: 217,434

[22] Filed: Jul. 11, 1988

[30] Foreign Application Priority Data

Sep. 11, 1987 [JP] Japan .................. 62-139269[U]

[51] Int. Cl.$^4$ ........................................ F16K 17/164
[52] U.S. Cl. .................. 137/456; 137/505.13; 137/557
[58] Field of Search .......... 137/456, 459, 503, 505.13, 137/505.15, 458, 496, 554, 557

[56] References Cited

U.S. PATENT DOCUMENTS

| | | | |
|---|---|---|---|
| 1,149,845 | 8/1915 | Lietz et al. | 137/459 |
| 3,276,470 | 10/1966 | Griffing | 137/505.15 |
| 3,476,133 | 11/1969 | Stedfeld | 137/456 X |
| 3,583,422 | 6/1971 | Dach et al. | 137/505.15 X |
| 3,621,873 | 11/1971 | Kenann | 137/460 X |
| 4,207,924 | 6/1980 | Peters | 137/458 X |
| 4,265,346 | 5/1981 | Emmadi | 137/505.13 X |
| 4,305,423 | 12/1981 | Adler | 137/505.13 |

FOREIGN PATENT DOCUMENTS

| | | | |
|---|---|---|---|
| 426321 | 7/1911 | France | 137/458 |
| 585481 | 12/1977 | U.S.S.R. | 137/505.15 |
| 22477 | of 1909 | United Kingdom | 137/459 |
| 2077885 | 12/1981 | United Kingdom | 137/505.13 |

Primary Examiner—Stephen Hepperle
Attorney, Agent, or Firm—Price, Heneveld, Cooper, DeWitt & Litton

[57] ABSTRACT

A main fluid passageway is provided in a main valve body between first and second ports formed and an auxiliary passageway having its opposite ends closed is also formed in the valve main body so as to intersect the main passageway. A spool is slidably mounted in the auxiliary passageway and gap spaces are provided at the opposite ends of the spool. One of the gap spaces communicates with the first port, while the other gap space communicates with the second port. A locking section is provided on the spool and a cooperating latch is provided in the valve main body. Upon occurrence of an emergency, the spool is moved to shut off the main passageway and the latch is caused to engage the locking section resulting in generation of an alarm. Under such condition, even if the pressure of the fluid at the valve varies, the locked condition of the spool can be maintained.

9 Claims, 1 Drawing Sheet

BREAKER VALVE

BACKGROUND OF THE INVENTION

1. FIELD OF THE INVENTION

The present invention relates to a breaker valve that is available in various types of oil hydraulic instruments or fluid systems.

2. DESCRIPTION OF THE PRIOR ART

Heretofore, in an oil hydraulic system used to raise a heavy body or in other oil hydraulic systems, in the event a portion of the conduits or rubber hoses have been damaged for any reason, or though not damaged, discharge of oil occurs at a flow rate exceeding a value preset in a breaker valve, a breaker valve would operate to shut off the oil hydraulic circuit so that the fall of a heavy body and excessive flow of oil will be prevented. In general, such a valve is called a "breaker valve", "fuse valve" or "emergency shut-off valve". Illustration is omitted because use of such a valve is a well-known fact.

However, the above-mentioned oil hydraulic systems involve the following problems. When an accident of the above-described type has occurred and after the above-mentioned emergency shut-off has operated, in some cases the damaged location is repaired after the heavy body has been lowered. Or, in an oil hydraulic system in which a plurality of oil hydraulic instruments are connected in parallel to each other and operated through a single main piping, when it is attempted to operate one of the plurality of oil hydraulic instruments while the piping for another oil hydraulic instrument is shut off at one of the locations, in some cases the pressure relationship at the breaker valve then in emergency shut-off condition would change, resulting in opening of the breaker valve. In the above-described cases, secondary accidents, such as unexpected operation of the oil hydraulic equipment to continue lifting a heavy body or unwanted discharge of fluid and the like, would occur.

SUMMARY OF THE INVENTION

It is therefore one object of the present invention to provide a breaker valve for an oil hydraulic system, which valve can prevent, after an accident has once occurred in the oil hydraulic system and the breaker valve has operated, a second accident from occurring due to a secondary cause such as during repair of the location of the accident.

Another object of the present invention is to provide a breaker valve of the above-mentioned type, which informs personnel of the existence of an emergency which has caused the shut-off valve to close.

According to one feature of the present invention, there is provided a breaker valve comprising a valve main body, a main passageway of fluid which extends through the valve main body and has a first and a second port formed at mutually staggered locations, an auxiliary passageway so formed as to intersect the main passageway and having its opposite ends closed, a spool slidably inserted in the auxiliary passageway, an annular recess formed in the spool midway of its length for completing a portion of the main passageway, an adjusting member so provided as to close one end of the auxiliary passageway for adjusting the position of the spool, a gap space formed between the adjusting member and the spool, a communication path for connecting the gap space with the annular recess, a closure member for closing the other end of the auxiliary passageway, a spring disposed between the closure member and the spool, a connecting path formed so as to communicate adjacent the other end of the auxiliary passageway with the first port, a locking section formed on the spool, and a latch provided in the valve main body and adapted to be engaged with the locking section.

According to another feature of the present invention, the valve main body includes a signal device adapted to be actuated upon engagement of the latch with the locking section.

DESCRIPTION OF THE PREFERRED EMBODIMENT

Figure 1:
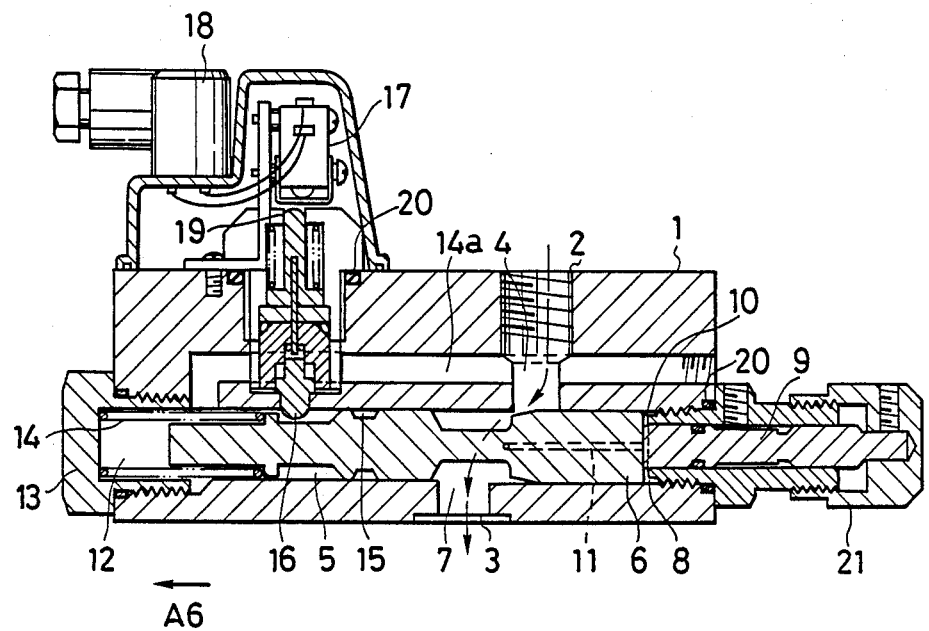
FIG. 1 is a cross-sectional view of a breaker valve according to one preferred embodiment of the present invention.
Figure 2:
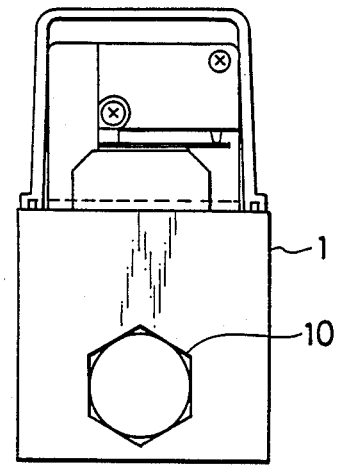
FIG. 2 is an end view of the same breaker valve.

Referring now to FIG. 1, a main passageway 4 for fluid is provided, extending through the main body 1 of the valve to form a first port 2 and a second port 3 at mutually staggered locations. A spool chamber or auxiliary passageway 5, having its opposite ends closed, is provided in the valve main body 1 so as to intersect the main passageway 4. In addition, within the auxiliary passageway 5 a spool 6 is slidably disposed. An annular recess 7 for completing a part of the main passageway is formed in the spool 6 midway of its length. Also, an adjusting member 9 is provided for adjusting the position of the spool 6. It also closes one end portion 8 of the auxiliary passageway 5. Between the adjusting member 9 and the spool 6 a gap space 10 is formed, and a communication path 11 is drilled in the spool 6 for connecting the gap space 10 with the annular recess 7. The path 11 is small to provide only a very restricted rate of fluid flow between the recess 7 and the gap space 10. Furthermore, a spring 14 is disposed between the closure member 13 for closing the other end portion 12 of the auxiliary passageway 5 and the above-mentioned spool 6. A connecting path 14a is provided to connect the other end portion 12 with the aforementioned first port 2. A locking section 15 is formed on the spool 6. In addition, in the valve main body 1 a latch 16 is provided adapted to engage with the locking section 15. Besides, reference numeral 17 designates a signal device, which is illustrated, by way of example, as an electric switch. This signal device 17 is adapted to be actuated in response to operation of the latch 16 for energizing a buzzer 18 or a lamp (not shown) contained in the same device 17. In addition, reference numeral 19 designates a tip end portion of the latch 16, numeral 20 designates an O-ring, and numeral 21 designates an adjusting screw.

Now, description will be made of the operation of the breaker valve according to the present invention which is constructed in the above-described manner.

Fluid, such as working oil or the like, is fed through the first port 2, then passed through the main passageway 4 and discharged through the second port 3. The second port 3 is connected to a hydraulic load such as a lifting device for a heavy body or the like, not shown. If, for any reason, damage to a hose, not shown, or the like should occur upstream of the first port 2, then the pressure at the first port 2 is lowered, causing a pressure difference to occur between the first port 2 and the second port 3. At that time, the pressure in the gap space 10 communicating with the annular recess 7 is maintained equal to the pressure at the second port 3 due to the restricted flow through the drilled path 11, while the pressure at the other end portion 12 of the auxiliary passageway 5 is lowered because the other end portion 12 communicates with the first port 2 through the passage 4a. Consequently, this results in an imbalance in the forces acting on the spool 6 causing the spool to move in the direction of arrow A6 against the resilient force of the spring 14, and thus the spool 6 will shut off the main passageway. Thereby, dropping of the heavy body, not shown, can be prevented.

Because the ports 2 and 3 are offset lengthwise of the spool chamber, the annular recess 7 remains connected to the port 3 after port 2 has been closed. Thus, the higher pressure of the third fluid in port 3 will continue to act on the end of the spool exposed to the gap space 10 moving the spool far enough to the left as illustrated to cause the locking section 15 to align with the latch 16. As the spool shifts, the ring-like ridge 15a passes under the latch 16 and pushing it up, resulting in actuation of the signal device 17. After the ridge 15a has passed to the left of the latch 16, the latch drops into the annular locking channel or section 15. A locking engagement then occurs between the locking section 15 and the latch 16. The latch 16 having been moved upwardly actuates the signal device 17. The buzzer 18 in the signal device 17 sounds or a lamp, not shown, in the signal device 17 is lightened. The signal device is of the type that, once actuated, remains in that condition until the latch 16 is once more lifted, permitting the spool 6 to shift back to the right causing the ridge 15a to again pass beneath the latch.

Next, under the above-mentioned condition, if reduction of the hydraulic load such as, for example, lowering of the lifted heavy body should occur downstream of the second port 3, in some cases in the prior art construction, the spool 6 was caused to move in the direction opposite to the direction of arrow A6 by the resilient force of the spring 14. However, according to the present invention, the spool 6 would not be moved in a direction opposite to the direction of arrow A6 because the spool 6 is locked in position by the locking engagement between the locking section 15 of other spool 6 and the latch 16 provided in the valve main body 1. This results from resistance to upward movement of the latch 16 produced by a combination of the steeply inclined walls of the locking section 15 and the resistance generated by the spring which urges the latch 16 downwardly. Thus, the intentional intervention of an operator is necessary to cause the valve to be returned to its normal operating position. Therefore, even if variation should occur in the hydraulic load being lifted, the spool 6 remains stationary, so that a secondary accident which may occur subsequent to the actuation of the emergency shut-off of the breaker valve can be prevented. Moreover, owing to the fact that the valve main body 1 is provided with a signal device 17 adapted to be actuated when the latch 16 operates it is capable of generating an alarm upon emergency shut-off of the breaker valve. In addition, it can prevent the main passageway being opened by the above-mentioned secondary accident resulting in reestablishing fluid flow.

We claim:

1. A breaker valve comprising a main valve body, a main passageway for fluid which passes through said valve main body, said passageway having first and second ports at locations offset lengthwise of the passageway, an auxiliary passageway formed so as to intersect said main passageway and having its opposite ends closed, a spool slidably inserted in said auxiliary passageway, said spool having an annular recess substantially spaced from both ends of said spool for completing a part of said main passageway when said spool is in one position, an adjusting member closing one end of said auxiliary passageway and movable lengthwise thereof for adjusting the position of said spool, a gap space formed between said adjusting member and the adjacent end of said spool, a passage for fluid communicating between said gap space and said annular recess, a closure member for closing the other end of said auxiliary passageway, a spring disposed between said closure member and said spool urging said spool into a position in which said annular recess interconnects said first and second ports, a path for fluid connecting said other end of said auxiliary passageway with said first port, a locking section formed on said spool, and a latch mounted in said valve main body means biasing said latch toward said spool, a recess in said spool aligned with said latch when said spool is in a position in which said first and second ports are connected, means on said spool for shifting said latch into spool locking position when said spool is shifted to close the passage between said first and second ports, said means also biasing said latch into engagement with said locking section.

2. An emergency shut-off valve for liquids actuated by a drop in pressure, said valve having a housing, an elongated valve chamber in said housing and a spool valve mounted in said valve chamber for movement lengthwise thereof, an inlet port and an outlet port communicating with said valve chamber, said ports being offset from each other lengthwise of said chamber, said spool valve having an annular channel connecting said ports, a first closure means closing the end of said valve chamber adjacent said ports and forming a space between said closure means and the adjacent end of said spool valve, a passage of a size to substantially restrict the flow of liquid therethrough communicating between said space and said annular channel, a second closure member for closing the other end of said valve chamber, a spring disposed between said second closure member and said spool urging said spool into a position in which said annular channel interconnects said ports, a conduit for fluid connecting said other end of said auxiliary passageway with said inlet port, a locking section formed on said spool aligned with said latch when said spool is in a position in which said ports are connected, said latch being caused to engage said locking section when said spool is shifted to close the passageway between said first and second ports.

3. An emergency shut-off valve for liquids actuated by a drop in pressure, said valve having a housing, an elongated valve chamber in said housing and a spool valve mounted in said valve chamber for movement lengthwise thereof, an inlet port and an outlet port communicating with said valve chamber, said ports being offset from each other lengthwise of said chamber, said spool valve having an annular channel connecting said ports, first and second closure means closing the opposite ends of said valve chamber and providing a space at each end of this spool between said spool and the adjacent closure means, a passage of a size to substantially restrict the flow of liquid therethrough communicating between one of said spaces and said annular channel, spring means adjacent said second closure member urging said spool toward said first closure means and into a position in which said annular channel interconnects said ports, a conduit for fluid connecting said space formed by said second closure means with said inlet port, a locking section formed on said spool and a latch mounted in said valve main body and means biasing said latch toward said spool and into the path of said spool, a recess in said spool aligned with said latch when said spool is in a position in which said ports are connected, said latch being caused to engage said locking section when said spool is shifted to close the passage between said first and second ports.

4. An emergency shut-off valve as described in claim 3 wherein said locking section is an annular channel in said spool.

5. An emergency shut-off valve as described in claim 4 wherein said latch engages a switch for generating a signal when said spool is axially displaced to bring said locking section into engagement with said latch.

6. An emergency shut-off valve as described in claim 4 wherein said spool has a radially extending ridge between said recess and said channel, said ridge urging said latch radially outwardly as it passes beneath said latch when the spool is shifted to close said valve chamber between said ports.

7. An emergency shut-off valve as described in claim 6 wherein the wall of said channel adjacent said ridge being shaped to prevent said latch being shifted radially by said spool once said latch has been seated in said channel.

8. An emergency shut-off valve as described in claim 5 wherein said switch has means for maintaining continuity of the signal after the latch has seated in the locking section.

9. A breaker valve for emergency isolation of a fluid pressure operated means from a source of fluid under pressure, said valve having a main body with a spool chamber extending lengthwise thereof, means closing both ends of said spool chamber, a spool valve slidably seated in said chamber, a fluid inlet port and a fluid outlet port communicating with said chamber, a first space at one end of said spool having fluid communication with said inlet port and a second space at the opposite end of said spool having fluid communication with said outlet port, a spring in said first space biasing said spool toward said second space, said outlet port being offset from said inlet port toward said first space lengthwise of said spool chamber; a latch member movable radially of said spool and means resiliently biasing said latch member toward said spool, a circumferential ridge on said spool positioned to pass under said latch member when said spool is shifted toward said first space as the result of a drop in fluid pressure at said inlet port and said first space and creating a pressure differential between said first and second spaces, a circumferential locking channel adjacent said ridge positioned to align with and seat said latch when said spool in response to said pressure differential has been shifted toward said first chamber for locking said spool in its shifted position.

* * * * *

UNITED STATES PATENT AND TRADEMARK OFFICE
CERTIFICATE OF CORRECTION

PATENT NO. : 4,830,045

DATED : May 16, 1989

INVENTOR(S) : Toshihiro Fujikawa et al.

It is certified that error appears in the above-identified patent and that said Letters Patent is hereby corrected as shown below:

Column 3, line 45:
"other" should be -- the --.

Column 4, line 49:
After "spool" insert -- and a latch mounted in said valve main body and means biasing said latch toward said spool, a recess in said spool --.

Signed and Sealed this

Twenty-ninth Day of January, 1991

Attest:

HARRY F. MANBECK, JR.

Attesting Officer     Commissioner of Patents and Trademarks